(12) United States Patent
Arrowood et al.

(10) Patent No.: US 8,036,105 B2
(45) Date of Patent: Oct. 11, 2011

(54) MONITORING A PROBLEM CONDITION IN A COMMUNICATIONS SYSTEM

(75) Inventors: Andrew H. Arrowood, Raleigh, NC (US); Michael G. Fitzpatrick, Raleigh, NC (US); Constantinos Kassimis, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 11/199,305

(22) Filed: Aug. 8, 2005

(65) Prior Publication Data

US 2007/0058525 A1    Mar. 15, 2007

(51) Int. Cl.
*G06F 11/07* (2006.01)
(52) U.S. Cl. ......................... 370/217; 370/244
(58) Field of Classification Search .............. 370/241, 370/242, 245, 248, 249, 253
See application file for complete search history.

(56) References Cited

U.S. PATENT DOCUMENTS

| | | | |
|---|---|---|---|
| 5,724,355 A * | 3/1998 | Bruno et al. | 370/401 |
| 5,848,227 A * | 12/1998 | Sheu | 714/4 |
| 6,049,524 A * | 4/2000 | Fukushima et al. | 370/220 |
| 6,052,733 A * | 4/2000 | Mahalingam et al. | 709/235 |
| 6,078,957 A * | 6/2000 | Adelman et al. | 709/224 |
| 6,148,411 A * | 11/2000 | Ichinohe et al. | 714/4 |
| 6,192,414 B1 * | 2/2001 | Horn | 709/239 |
| 6,269,401 B1 * | 7/2001 | Fletcher et al. | 709/224 |
| 6,370,653 B1 * | 4/2002 | Ichinohe et al. | 714/4 |
| 6,430,622 B1 * | 8/2002 | Aiken et al. | 709/245 |
| 6,618,805 B1 | 9/2003 | Kampe | |
| 6,691,244 B1 * | 2/2004 | Kampe et al. | 714/4 |
| 6,718,383 B1 * | 4/2004 | Hebert | 709/224 |
| 6,721,907 B2 * | 4/2004 | Earl | 714/57 |
| 6,732,186 B1 * | 5/2004 | Hebert | 709/239 |
| 6,763,479 B1 * | 7/2004 | Hebert | 714/4 |
| 6,839,752 B1 | 1/2005 | Miller et al. | |
| 6,854,069 B2 | 2/2005 | Kampe et al. | |
| 6,874,099 B1 * | 3/2005 | Balasubramanian et al. | 714/4 |
| 6,941,366 B2 * | 9/2005 | Antes et al. | 709/224 |
| 7,003,572 B1 * | 2/2006 | Lownsbrough et al. | 709/227 |
| 7,126,944 B2 * | 10/2006 | Rangarajan et al. | 370/389 |
| 7,155,536 B2 * | 12/2006 | Mongazon-Cazavet et al. | 709/242 |
| 7,184,394 B2 * | 2/2007 | Rombeaut et al. | 370/219 |

(Continued)

FOREIGN PATENT DOCUMENTS

EP      607681 A2 *   7/1994

OTHER PUBLICATIONS

IBM Corporation, "IBM z/OS V1.5: Extends mainframe innovation and delivers the z/OS V1.4 Consoles Enhancements feature, and Preview: z/OS V1.6" and "IBM US Announcement Supplemental Information," Software Announcement, Feb. 10, 2004, pp. 1-4 and 1-19.

(Continued)

*Primary Examiner* — Ricky Ngo
*Assistant Examiner* — Ben Liu
(74) *Attorney, Agent, or Firm* — A. Bruce Clay (57) ABSTRACT

A solution for monitoring a problem condition in a communications system is provided. A communications protocol implementation monitors the communications system for the problem condition. The communications protocol implementation can initiate a response based on the problem condition being present. In this manner, the communications protocol implementation provides an effective monitor for detecting and/or recovering from a problem condition in the communications system.

9 Claims, 5 Drawing Sheets

U.S. PATENT DOCUMENTS

| | | | |
|---|---|---|---|
| 7,227,838 B1* | 6/2007 | O'Riordan | 370/219 |
| 7,319,665 B2* | 1/2008 | Kim et al. | 370/218 |
| 7,406,035 B2* | 7/2008 | Harvey et al. | 370/218 |
| 7,421,478 B1* | 9/2008 | Muchow | 709/209 |
| 7,440,394 B2* | 10/2008 | Ohenoja et al. | 370/216 |
| 7,490,161 B2* | 2/2009 | Ren | 709/238 |
| 7,535,826 B1* | 5/2009 | Cole et al. | 370/218 |
| 7,583,603 B2* | 9/2009 | Akyol et al. | 370/238 |
| 7,860,069 B2* | 12/2010 | Wawra et al. | 370/338 |
| 2002/0059451 A1* | 5/2002 | Haviv | 709/238 |
| 2003/0037159 A1* | 2/2003 | Zhao et al. | 709/232 |
| 2005/0283529 A1* | 12/2005 | Hsu et al. | 709/224 |

OTHER PUBLICATIONS

Arrowood et al., U.S. Appl. No. 11/199,301, Office Action Communication, Jun. 17, 2008, 26 pages.

Arrowood et al., U.S. Appl. No. 11/199,301, Amendment to Office Action Communication, Jul. 29, 2008, 11 pages.

U.S. Appl. No. 11/199,301, Final Office Action, Sep. 30, 2008, 33 pages.

U.S. Appl. No. 11/199,301, RCE/ Amendment Nov. 10, 2008, 14 pages.

Arrowood et al., U.S. Appl. No. 11/199,301, Office Action Communication, Dec. 19, 2008, 32 pages.

* cited by examiner

MONITORING A PROBLEM CONDITION IN A COMMUNICATIONS SYSTEM

REFERENCE TO RELATED APPLICATION

The current application is related to co-owned and co-pending U.S. patent application Ser. No. 11/199,301, filed on Aug. 8, 2005, and entitled "Monitoring A Problem Condition In A Communications Protocol Implementation", which is hereby incorporated herein by reference.

BACKGROUND OF THE INVENTION

1. Technical Field

The invention relates generally to monitoring a problem condition in a communications system, and more particularly, to a communications protocol implementation that monitors the communications system for the presence of the problem condition.

2. Background Art

A systems network architecture (SNA) network provides high availability for mainframe systems, such as a zSeries eServer offered by International Business Machines Corp. of Armonk, N.Y. (IBM). Operating systems, such as IBM's z/OS exploit features of the SNA network to provide high performance for applications executing in a mainframe system. However, workloads processed by these mainframe systems are increasingly being driven by client requests flowing over an internet protocol (IP) network infrastructure. As a result, a lot of emphasis has been placed on ensuring that the z/OS IP network infrastructure delivers the same high availability attributes as those provided by the SNA network.

The use of a dynamic virtual IP address (DVIPA) is an important virtualization technology that assists in providing high availability z/OS solutions using IP networks in a cluster system (sysplex) environment. DVIPA provides an ability to separate the association of an IP address with a physical network adapter interface. To this extent, DVIPA can be viewed as a virtual destination that is not bound to a particular system/network interface, and therefore is not bound to any failure of any particular system/network interface. This results in a highly flexible configuration that provides the high availability on which many z/OS solutions depend.

DVIPA can be deployed using one of various configurations. Each configuration provides protection against a failure of a system, network interface and/or application. For example, in multiple application-instance DVIPA, a set of applications executing in the same z/OS image are represented by a DVIPA. This DVIPA allows clients to reach these applications over any network interface attached to the z/OS image and allows for automatic rerouting of traffic around a failure in a particular network interface. Additionally, should the primary system fail or enter a planned outage, the DVIPA can be automatically moved to another system in the sysplex. Further, a unique application-instance DVIPA can be associated with a particular application instance in the sysplex. In this case, the DVIPA can be dynamically moved to any system in the sysplex on which the application is executing. This DVIPA provides automatic recovery in scenarios where a particular application or system fails. In particular, a new instance of the application running on another system can trigger the DVIPA to be moved to the other system, allowing client requests to continue to be able to reach the application. Still further, a distributed DVIPA represents a cluster of one or more applications executing on various systems within a sysplex. In this case, new client transmission control protocol (TCP) connection requests can be load balanced across application instances active anywhere in the sysplex, thereby providing protection against the failure of any system, network interface and/or application in the sysplex, while also providing an ability to deploy a highly scalable solution within the sysplex.

IP requires a single owner of each IP address. Consequently, when DVIPA is implemented, a single system in the sysplex is responsible for ownership of each DVIPA. The owner system of each DVIPA advertises its ownership to other routing daemons in the network. This advertisement is performed using a dynamic routing protocol, such as OSPF, via a routing daemon (for example, OMPROUTE), that is associated with each system. In particular, the routing daemon broadcasts (advertises) the DVIPA to other routing daemons in the network. DVIPA technology provides high availability by automatically detecting the failure of a major component, such as a hardware system, an operating system, a TCP/IP protocol stack, a network adapter or an application, and automatically initiating recovery actions. To this extent, ownership of the DVIPA can move to a backup system and the routing daemon on the backup system will broadcast ownership of the DVIPA. In this manner, client requests can continue to be processed successfully by the sysplex. As a result, DVIPA provides high availability TCP/IP communications to an application running in a sysplex environment when a major component fails.

However, no mechanism monitors the health of each routing daemon. Consequently, if a routing daemon has problems, DVIPA information may no longer be advertised, incorrect DVIPA information may be advertised to other routing daemons, or the like. To this extent, a need exists for an improved communications protocol implementation that monitors the health of a communications system, such as a routing daemon.

SUMMARY OF THE INVENTION

The invention provides a solution for monitoring a problem condition in a communications system. A communications protocol implementation monitors the communications system for the problem condition using, for example, a heartbeat signal generated by the communications system. The communications protocol implementation can initiate a response based on the problem condition being present. For example, the communications protocol implementation can issue one or more eventual action messages. Further, the communications protocol implementation can perform an automatic recovery. In one embodiment, the communications protocol implementation comprises a TCP/IP stack that belongs to a group of TCP/IP stacks and the communications system comprises a routing daemon used by the TCP/IP stack. In this case, the automatic recovery can include leaving the group, instructing the routing daemon to stop broadcasting one or more DVIPAs, and if unsuccessful, terminating the TCP/IP stack. In this manner, the communications protocol implementation provides an effective monitor for detecting and/or recovering from a problem condition in the communications system.

A first aspect of the invention provides a method of monitoring a problem condition in a communications system, the method comprising: determining a time period since a communications protocol implementation received a heartbeat signal from the communications system; and initiating a response from the communications protocol implementation when the time period exceeds a time threshold.

A second aspect of the invention provides a communications protocol implementation comprising: a system for processing messages in the communications protocol; a system for monitoring a problem condition of a communications system used by the communications protocol implementation; and a system for initiating a response based on the problem condition being present.

A third aspect of the invention provides a system for processing messages in a communications protocol, the system comprising: a communications system for performing a communications function; and a communications protocol implementation that includes: a system for processing messages in the communications protocol; a system for monitoring a problem condition of the communications system; and a system for initiating a response based on the problem condition being present.

A fourth aspect of the invention provides a cluster of systems for processing TCP/IP messages, the cluster comprising: a plurality of systems, wherein each system in the plurality of systems comprises: a routing daemon that broadcasts ownership of an IP address; and a TCP/IP stack that includes: a system for processing TCP/IP messages; a system for monitoring a problem condition of the routing daemon; and a system for initiating a response based on the problem condition being present.

A fifth aspect of the invention provides a computer-readable medium that includes computer program code to enable a computer infrastructure to monitor a problem condition in a communications system and/or process messages in a communications protocol, the computer-readable medium comprising computer program code for performing at least some of the method steps described herein.

A sixth aspect of the invention provides a method of generating a system for monitoring a problem condition in a communications system and/or processing messages in a communications protocol, the method comprising: obtaining a computer infrastructure; and deploying means for performing at least some of the steps described herein to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a solution for monitoring a problem condition in a communications system. A communications protocol implementation monitors the communications system for the problem condition using, for example, a heartbeat signal generated by the communications system. The communications protocol implementation can initiate a response based on the problem condition being present. For example, the communications protocol implementation can issue one or more eventual action messages. Further, the communications protocol implementation can perform an automatic recovery. In one embodiment, the communications protocol implementation comprises a TCP/IP stack that belongs to a group of TCP/IP stacks and the communications system comprises a routing daemon used by the TCP/IP stack. In this case, the automatic recovery can include leaving the group, instructing the routing daemon to stop broadcasting one or more DVIPAs, and if unsuccessful, terminating the TCP/IP stack. In this manner, the communications protocol implementation provides an effective monitor for detecting and/or recovering from a problem condition in the communications system.

Figure 1:
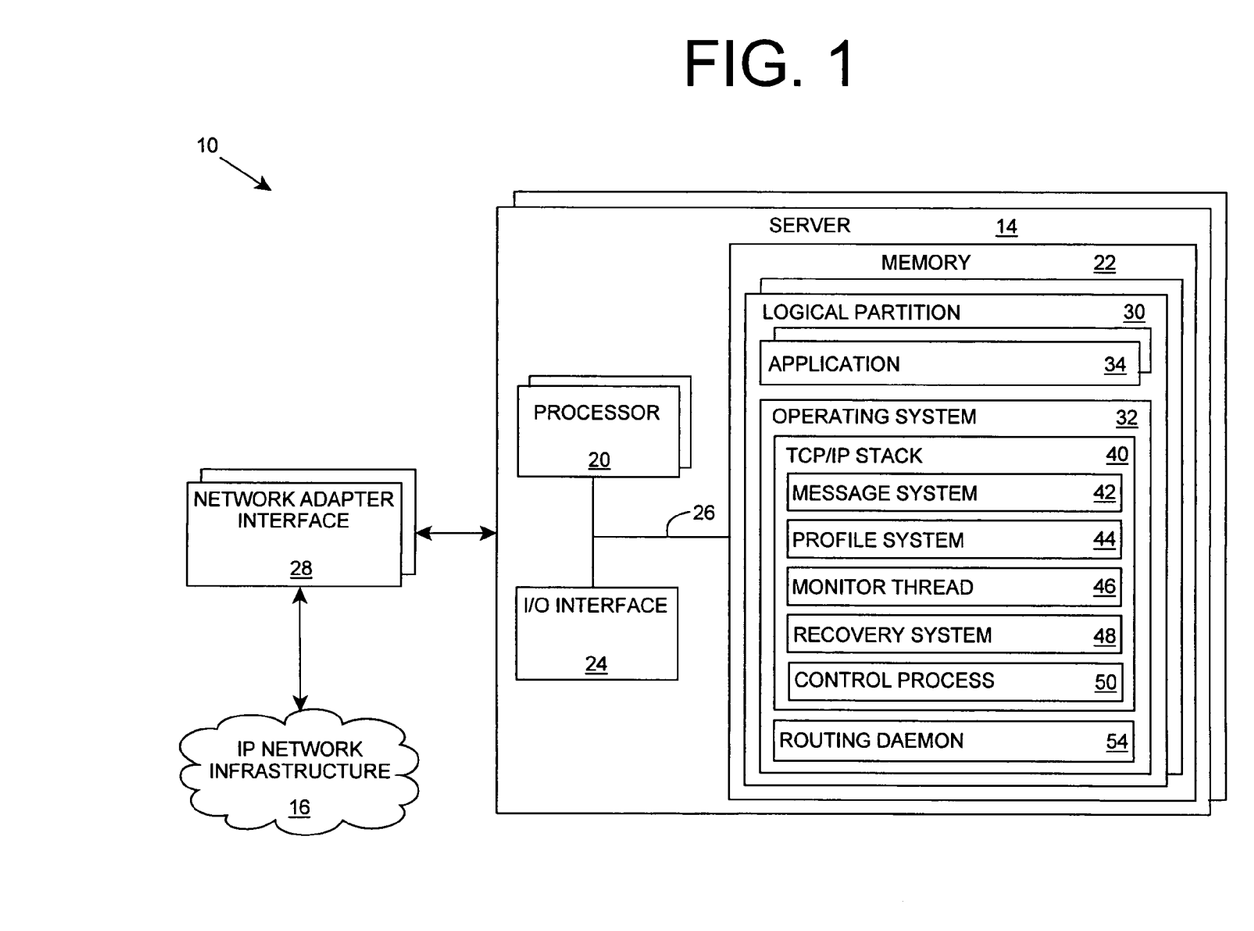
FIG. 1 shows an illustrative computing environment according to one embodiment of the invention.

Turning to the drawings, FIG. 1 shows an illustrative computing environment 10 according to one embodiment of the invention. In particular, environment 10 comprises a cluster of systems (servers) 14 that communicate over a network, such as an internet protocol (IP) network infrastructure 16, via a set of network adapter interfaces 28. Server 14 is shown including one or more processors 20, a memory 22, an input/output (I/O) interface 24 and a bus 26. As is known in the art, memory 22 is capable of including a plurality of logical partitions 30, each of which includes an operating system 32, which can be running one or more applications 34. In general, processor(s) 20 execute computer program code, such as application 34, that is stored in memory 22. While executing computer program code, processor 20 can read and/or write data to/from memory 22 and/or I/O interface 24. Bus 26 provides a communications link between each of the components in server 14. I/O interface 24 can comprise any device that enables a user (not shown) to interact with server 14 and/or enables server 14 to communicate with one or more other computing devices, such as network adapter interface 28, with or without the use of one or more additional components.

Communications between application 34 and one or more nodes (e.g., computing devices, applications, etc.) connected to IP network infrastructure 16 use a particular communications protocol. For example, common communication protocols comprise the transmission control protocol (TCP), and the internet protocol (IP), which together are commonly used to enable communication over public and/or private networks. IP network infrastructure 16 can comprise any combination of one or more types of networks (e.g., the Internet, a wide area network, a local area network, a virtual private network, etc.). Further, communication over IP network infrastructure 16 can utilize any combination of various wired/wireless transmission techniques and/or communication links. While shown and discussed herein with reference to the TCP/IP protocol as an illustrative embodiment, it is understood that the invention is not limited to TCP/IP protocol, and any type of communications protocol can be used.

The communications protocol defines how messages are created and subsequently processed by the sender and receiver. For example, the communications protocol defines a format for messages, specifies how endpoints are identified, specifies how data is stored, and the like. In order to process messages in a particular communications protocol, an operating system 32 generally includes an implementation of the communications protocol. When the communications protocol is implemented using a hierarchy of software layers, the communications protocol implementation is typically referred to as a "protocol stack". To this extent, operating system 32 is shown including a TCP/IP stack 40 that provides support for sending and receiving messages in the TCP and IP protocols. Additionally, operating system 32 can include one or more additional communications systems that can be utilized and/or shared by a communications protocol implementation while processing messages. For example, operating system 32 is shown including a routing daemon 54 that can be used by TCP/IP stack 40 and/or one or more additional systems in logical partition 30.

TCP/IP stack 40 enables operating system 32 to process messages in the TCP and IP protocols by performing some or all of the process steps described herein. To this extent, TCP/IP stack 40 is shown including a message system 42, a profile system 44, a monitor thread 46, a recovery system 48 and a control process 50. Operation of each of these systems is discussed further below. However, it is understood that some of the various systems shown in FIG. 1 can be implemented independently, combined, and/or stored in memory for one or more separate computing devices that are included in environment 10. Further, it is understood that some of the systems and/or functionality may not be implemented, or additional systems and/or functionality may be included as part of environment 10.

Figure 2:
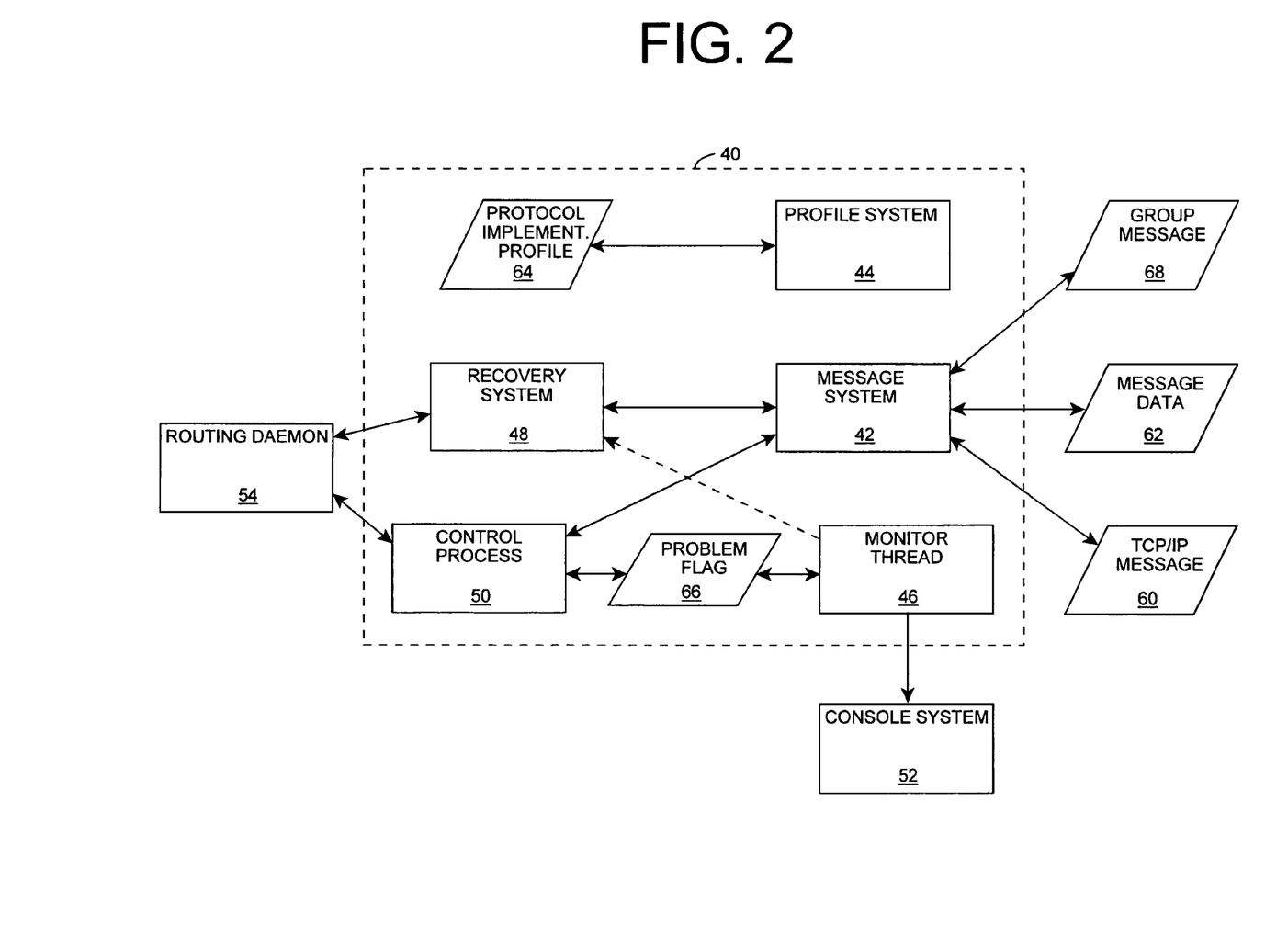
FIG. 2 shows an illustrative data flow diagram that can be implemented by the TCP/IP stack of FIG. 1 according to one embodiment of the invention.

Regardless, the invention provides a communications protocol implementation, such as TCP/IP stack 40, that monitors a set (one or more) of problem conditions in a communications system, such as routing daemon 54. FIG. 2 shows an illustrative data flow diagram that can be implemented by TCP/IP stack 40 according to one embodiment of the invention. In particular, message system 42 can receive a TCP/IP message 60, process the TCP/IP message 60, and forward message data 62 and/or TCP/IP message 60 to another node (e.g., application 34 of FIG. 1) for further processing. Similarly, message system 42 can receive message data 62, generate one or more TCP/IP messages 60 based on message data 62, and forward TCP/IP message(s) 60 to another node (e.g., network adapter interface 28 of FIG. 1) for further processing.

TCP/IP stack 40 can belong to a group (two or more) of TCP/IP stacks 40 that collectively process TCP/IP messages 60 using, for example, DVIPA technology. In this case, message system 42 can further process (e.g., send and receive) one or more group messages 68 from other TCP/IP stacks 40 that belong to the group (e.g., implemented on other servers 14 (FIG. 1) in the cluster). In order to implement some or all of the communications functions between group members and/or over IP network infrastructure 16, TCP/IP stack 40 can be implemented along with one or more communication systems implemented in operating system 32 (FIG. 1). TCP/IP stack 40 can use one or more of these communication systems, such as routing daemon 54, to perform one or more communications functions. The communications function(s) can comprise generic functions that can be implemented once in operating system 32 and used by various systems, such as TCP/IP stack 40. For example, when TCP/IP stack 40 supports DVIPA addresses, routing daemon 54 can comprise an OMPROUTE daemon that broadcasts ownership of a DVIPA to other routing daemons in the network using a dynamic routing protocol.

In order to exploit a communications system, such as routing daemon 54, TCP/IP stack 40 can include a set (one or more) of control processes 50, each of which controls a unique communications system/resource exploited by message system 42. Control process 50 can manage obtaining routing daemon 54, exploiting routing daemon 54 (e.g., reading/writing data from/to routing daemon 54), relinquishing routing daemon 54, and the like, in a known manner.

When one or more communications systems used by TCP/IP stack 40 are not working properly, TCP/IP stack 40 may not be able to implement all of the required functionality when processing TCP/IP messages 60 and/or group messages 68. For example, when routing daemon 54 is not working properly, TCP/IP stack 40 may not be able to properly implement some or all of the DVIPA functionality. To this extent, TCP/IP stack 40 can include a system for monitoring one or more problem conditions in a communications system, such as routing daemon 54, and/or initiating a response based on a problem condition being present. TCP/IP stack 40 can monitor a problem condition in routing daemon 54 using any known solution. For example, routing daemon 54 can generate a heartbeat signal each time it successfully performs a particular unit of work. In this case, the unit of work should be selected so that it is performed regularly (e.g., every three seconds) by routing daemon 54 regardless of an amount of communications, type of communications, or the like, being processed by TCP/IP stack 40.

In one embodiment, TCP/IP stack 40 monitors a problem condition in routing daemon 54 based on the heartbeat signal using control process 50 and a monitor thread 46. Monitor thread 46 can execute periodically, and monitor several communications systems and/or problem conditions for each communications system. Further, monitor thread 46 can set a problem flag 66 that is unique to each problem condition and communications system combination based on the problem condition being present.

Prior to setting problem flag 66, monitor thread 46 can first determine whether the problem condition has persisted for at least a predefined problem time period. The problem time period can be fixed or can be configured by a user/system. In the latter case, the problem time period can be defined in a protocol implementation profile 64. For example, TCP/IP stack 40 can include a profile system 44 for managing protocol implementation profile 64. Profile system 44 can generate a user interface or the like that enables a user to define the one or more profile settings (e.g., the problem time period), can read and/or process profile setting data, can receive and/or generate profile setting data, can write profile setting data to protocol implementation profile 64, and/or the like.

In any event, profile system 44 can obtain protocol implementation profile 64 and provide profile setting data to other systems in TCP/IP stack 40. To this extent, profile system 44 can obtain the problem time period from protocol implementation profile 64 and provide it to monitor thread 46. In one embodiment, monitor thread 46 is periodically executed based on the problem time period. For example, monitor thread 46 could be executed four times during the problem time period (e.g., every fifteen seconds when the problem time period is set to sixty seconds). When monitor thread 46 is monitoring multiple problem conditions, the same problem time period can be used for all of the problem conditions. Alternatively, different problem time periods could be defined for different problem conditions. In the latter case, the frequency with which monitor thread 46 is executed can be determined based on the shortest problem time period. Alternatively, monitor thread 46 could comprise multiple threads, each of which monitors a unique set of related problem conditions (e.g., all problem conditions having the same problem time period).

Figure 3:
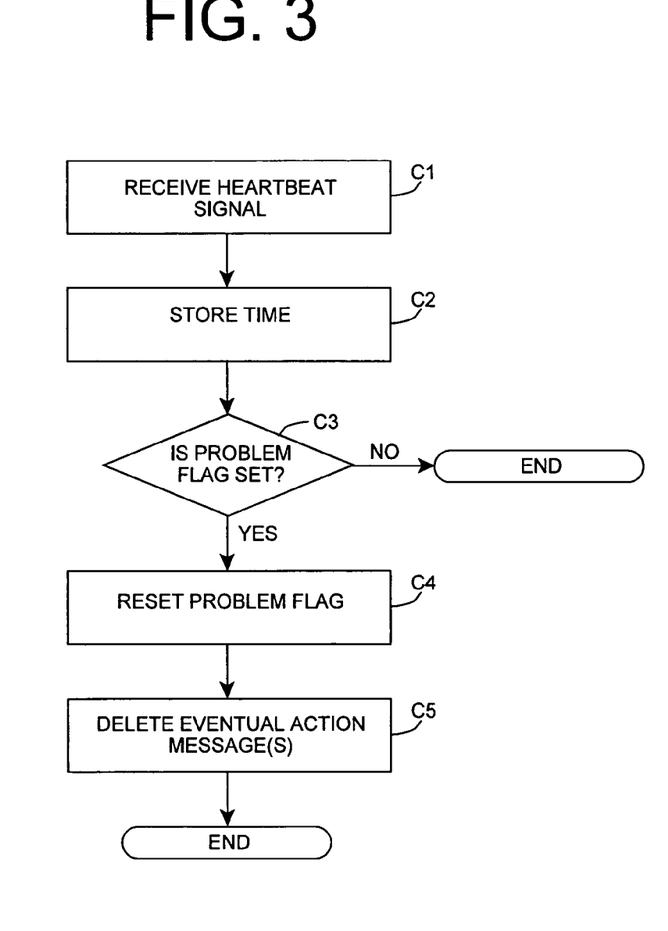
FIG. 3 shows illustrative process steps that can be performed by the control process of FIGS. 1 and 2.

When routing daemon 54 generates a heartbeat signal, control process 50 can receive the heartbeat signal. FIG. 3 shows illustrative process steps that can be performed by control process 50 (FIG. 2) when monitoring the problem condition(s) in routing daemon 54 (FIG. 2) based on the heartbeat signals. Referring to FIGS. 2 and 3, in step C1, control process 50 can receive a new heartbeat signal from routing daemon 54. Subsequently, in step C2, control process 50 can store a time for the heartbeat signal. The time can comprise the current system time, a time that the heartbeat signal was received, a time included in the heartbeat signal by routing daemon 54, or the like.

Figure 4:
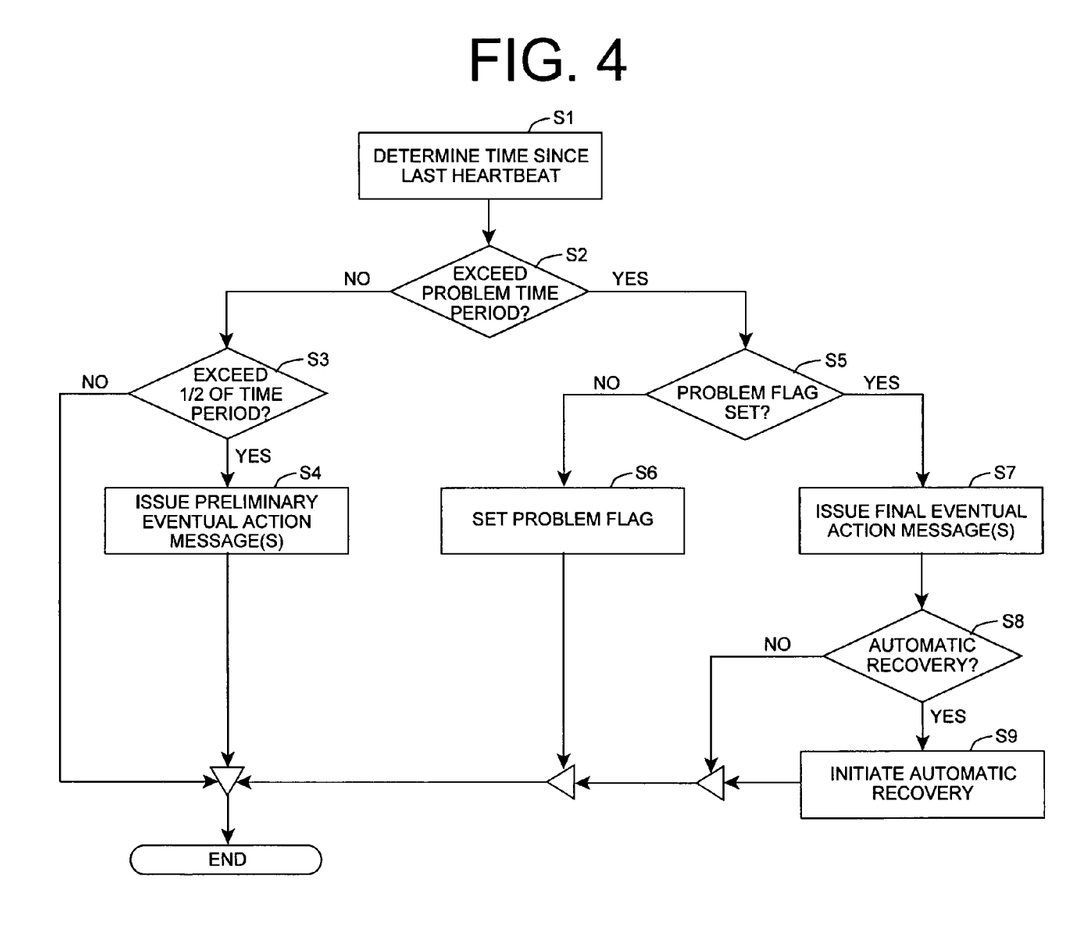
FIG. 4 shows illustrative process steps that can be performed by the monitor thread of FIGS. 1 and 2.

As noted above, monitor thread 46 can be executed periodically. FIG. 4 shows illustrative process steps that can be performed by monitor thread 46 (FIG. 2) when monitoring the problem condition(s) in routing daemon 54 (FIG. 2) based on the heartbeat signals. Referring to FIGS. 2 and 4, in step S1, monitor thread 46 can determine a time period since the heartbeat signal was last received. For example, monitor thread 46 can subtract the stored time from the current system time. As shown, monitor thread 46 can perform a single pass through the steps and then end. In this case, TCP/IP stack 40 can periodically execute monitor thread 46, e.g., every fifteen seconds, at which point monitor thread 46 checks for a new heartbeat signal. Alternatively, instead of ending, flow could return to step S1. In this case, monitor thread 46 can wait (e.g., sleep) in step S1 for a time out period, such as fifteen seconds, before determining the time since the last heartbeat signal was received.

In step S2, monitor thread 46 determines if the time period exceeds a time threshold, such as a problem time period. When monitor thread 46 determines that the time period does not exceed the problem time period, then in step S3, monitor thread 46 can determine whether the time period exceeds a second time threshold, such as a preliminary time period. The preliminary time period can comprise a shorter time period than the problem time period. Further, the preliminary time period can be separately defined and/or defined based on the problem time period. In one embodiment, the preliminary time period is calculated as one half of the problem time period.

When the time period exceeds the preliminary time period, then in step S4, monitor thread 46 can initiate a preliminary response. For example, monitor thread 46 can issue one or more preliminary eventual action messages. The preliminary eventual action messages can be provided for display at a console system 52, processing by another system, or the like. Console system 52 can comprise a computer that an operator (not shown) uses to monitor activity within cluster 10 (FIG. 1) as is known in the art. The preliminary eventual action message(s) can act as a warning that a system may be about to stop functioning properly by providing a warning that a problem condition is present, but that the length of time has not been sufficient to require immediate action. For example, when an availability of processor(s) 20 (FIG. 1) is beginning to become constrained, the time periods between heartbeat signals could toggle below and above the preliminary time period. By sending the preliminary eventual action message (s), the operator may have enough time to take corrective action to remedy the problem condition.

When monitor thread 46 determines that the time period exceeds the problem time period in step S2, then in step S5, monitor thread 46 can determine if problem flag 66 has been set. When problem flag 66 is not set, then in step S6, monitor thread 46 sets problem flag 66 and ends. Returning to FIGS. 2 and 3, after control process 50 receives a heartbeat signal, then in step C3, it checks whether problem flag 66 has been set. If so, then in step C4, control process 50 resets problem flag 66. Since monitor thread 46 only processes routing daemon 54 once during each execution, problem flag 66 will be set for at least the time period between consecutive executions of monitor thread 46 before any action is taken. This enables control process 50 to act as a check against the false identification of a problem condition by monitor thread 46, e.g., when a problem condition occurs for only a brief period of time.

Returning to FIGS. 2 and 4, when monitor thread 46 determines that the problem has persisted for the problem time period (step S2) and problem flag 66 is set (step S5), then the problem condition has persisted for the problem time period and for at least one additional execution of monitor thread 46, during which control process 50 could have reset problem flag 66. Consequently, monitor thread 46 can take action in response to the problem condition. To this extent, in step S7, monitor thread 46 can initiate a final response. For example, monitor thread 46 can issue one or more final eventual action message(s). The final eventual action message(s) can indicate that the problem condition has been present for a sufficient period of time that action is required. Returning to FIGS. 2 and 3, when control process 50 detects that problem flag 66 is set in step C3, then in step C5, it can delete any preliminary and/or final eventual action messages that were issued by monitor thread 46. In this manner, a user and/or another system can be made aware that the problem condition has been cleared, and no additional action will be taken in response to the cleared problem condition.

TCP/IP stack 40 can further perform an automatic recovery based on the presence of the problem condition. Returning to FIGS. 2 and 4, in step S8, monitor thread 46 can determine if TCP/IP stack 40 is configured to perform the automatic recovery. For example, protocol implementation profile 64 can comprise a setting that indicates whether TCP/IP stack 40 is configured to perform the automatic recovery. In this case, profile system 44 can obtain the setting from protocol implementation profile 64 and provide it to monitor thread 46. When TCP/IP stack 40 is configured to perform the automatic recovery, then in step S9, monitor thread 46 can initiate the automatic recovery. For example, monitor thread 46 can signal a recovery system 48 that is included in TCP/IP stack 40 to perform the automatic recovery based on the problem condition for routing daemon 54.

Figure 5:
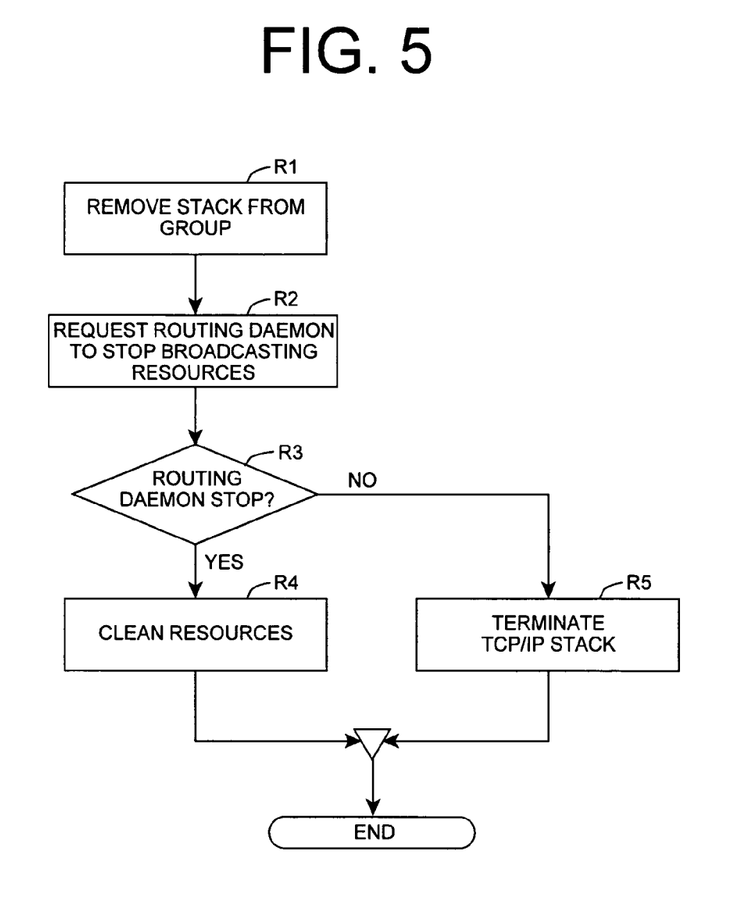
FIG. 5 shows illustrative process steps that can be performed by the recovery system of FIGS. 1 and 2.

Recovery system 48 can perform one or more process steps for the automatic recovery. To this extent, FIG. 5 shows illustrative process steps that can be performed by recovery system 48. Referring to FIGS. 2 and 5, in step R1, recovery system 48 can remove TCP/IP stack 40 from a group of TCP/IP stacks 40. To this extent, when routing daemon 54 comprises a problem condition, message system 42 may be prevented from performing certain functions required when a member of the group. In this case, recovery system 48 can signal message system 42 to send a group message 68 indicating that TCP/IP stack 40 is leaving the group. The remainder of the group will react as if TCP/IP stack 40 has failed. To this extent, any DVIPA owned by TCP/IP stack 40 will be transferred to another member of the group and the group can continue to successfully process TCP/IP messages 60 for the DVIPA.

Further, recovery system 48 can request that the communications system with the problem condition stop performing one or more of its communications functions. In particular, the communications system may be performing only some functions and/or partially performing one or more functions. In either case, the partial functionality can adversely impact the overall function provided by the group. For example, when the communications system comprises routing daemon 54, it may be continuing to broadcast ownership of one or more DVIPAs while failing to communicate with one or more group members. To this extent, in step R2, recovery system 48 can request routing daemon 54 to stop broadcasting ownership of one or more resources, such as a DVIPA. The remainder of the group will react as if TCP/IP stack 40 has failed. To this extent, any DVIPA owned by TCP/IP stack 40 will be transferred to another member of the group and the group can continue to successfully process TCP/IP messages 60 for the DVIPA.

For certain problem conditions, recovery system 48 may not be able to successfully stop the communications system from performing the communications function. Consequently, in step R3, recovery system 48 can determine if routing daemon 54 has stopped broadcasting. If so, then in step R4, recovery system 48 can clean any resources, and TCP/IP stack 40 can continue to function without belonging to the group, thereby not requiring routing daemon 54. In particular, TCP/IP stack 40 can continue to process TCP/IP messages 60 for a normal IP address or a static virtual internet protocol address. When routing daemon 54 does not stop broadcasting, then in step R5, recovery system 48 can terminate TCP/IP stack 40. This forces TCP/IP stack 40 to be removed from the group and effectively leaves routing daemon 54 with nothing to broadcast.

It is understood that the process steps shown in FIGS. 3-5 are only illustrative, and both the order of steps and actions taken can vary based on a particular implementation. Further, it is understood that additional functions can be performed by control process 50, monitor thread 46 and/or recovery system 48 when implementing their respective functionality. For example, while performing the automatic recovery, recovery system 48 can issue one or more eventual action message(s) that indicate the status of the automatic recovery.

While shown and described herein as a method and system for monitoring a problem condition in a communications system and/or processing messages in a communications protocol, it is understood that the invention further provides various alternative embodiments. For example, in one embodiment, the invention provides a computer-readable medium that includes computer program code to enable a computer infrastructure to monitor a problem condition in a communications system and/or process messages in a communications protocol. To this extent, the computer-readable medium includes program code, such as TCP/IP stack 40 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) (e.g., a fixed disk, a read-only memory, a random access memory, a cache memory, etc.), and/or as a data signal traveling over a network (e.g., during a wired/wireless electronic distribution of the program code).

In still another embodiment, the invention provides a method of generating a system for monitoring a problem condition in a communications system and/or processing messages in a communications protocol. In this case, a computer infrastructure, such as environment 10 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as server 14, from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer implemented method of using a status of a first routing daemon used by a first TCP/IP stack to determine when to transfer an IP address from the first TCP/IP stack to a second TCP/IP stack in a computer network cluster system environment, the method comprising:
    broadcasting ownership of the IP address, with the first routing daemon of the first TCP/IP stack, to router modules in the cluster system environment;
    monitoring a heartbeat signal, generated by the first routing daemon for a problem condition, with a control process of the first TCP/IP stack; and
    moving ownership of the IP address broadcast by the first routing daemon of the first TCP/IP stack to a second routing daemon of a second TCP/IP stack in the computer network cluster system environment when said heartbeat signal of the first routing daemon is no longer received by said control process of the first TCP/IP stack.

2. The method of claim 1, further comprising:
    storing a time of receipt for the heartbeat signal in a memory associated with the first TCP/IP stack.

3. The method of claim 2, wherein moving ownership of the IP address from the first TCP/IP stack to the second TCP/IP stack occurs after a predetermined time period for which said heartbeat signal is no longer received by said control process of the first TCP/IP stack.

4. A computer program product for using a status of a first routing daemon used by a first TCP/IP stack to determine when to transfer an IP address from the first TCP/IP stack to a second TCP/IP stack in a computer network cluster system environment, the computer program product comprising a computer readable storage medium having computer readable program code embodied therewith, comprising:
    computer readable program code configured to broadcast ownership of the IP address, with the first routing daemon of the first TCP/IP stack, to router modules in the cluster system environment;
    computer readable program code configured to monitor a heartbeat signal, generated by the first routing daemon, for a problem condition, with a control process of the first TCP/IP stack; and computer readable program code configured to move ownership of the IP address broadcast by the first routing daemon of the first TCP/IP stack to a second routing daemon of a second TCP/IP stack in the computer network cluster system environment when said heartbeat signal of the first routing daemon is no longer received by said control process of the first TCP/IP stack.

5. The computer program product of claim 4, further comprising computer readable program code configured to store a time of receipt for said heartbeat signal in a memory associated with the first TCP/IP stack.

6. The computer program product of claim 5, wherein the computer readable program code configured to move ownership of the IP address broadcast by the first routing daemon of the first TCP/IP stack to a second routing daemon of a second TCP/IP stack occurs after a predetermined time period for which said heartbeat signal is no longer received by said control process of the first TCP/IP stack.

7. A computer system for using a status of a first routing daemon used by a first TCP/IP stack to determine when to transfer an IP address from the first TCP/IP stack to a second TCP/IP stack in a computer network cluster system environment, the computer system comprising a processor programmed to:

broadcast ownership of the IP address, with the first routing daemon of the first TCP/IP stack, to router modules in the cluster system environment;

monitor a heartbeat signal, generated by the first routing daemon, for a problem condition, with a control process of the first TCP/IP stack; and move ownership of the IP address broadcast by the first routing daemon of the first TCP/IP stack to a second routing daemon of a second TCP/IP stack in the computer network cluster system environment when said heartbeat signal of the first routing daemon is no longer received by said control process of the first TCP/IP stack.

8. The computer system of claim 7, wherein the processor is further programmed to store a time of receipt for said heartbeat signal in a memory associated with the first TCP/IP stack.

9. The computer system of claim 8, wherein the processor is programmed to move ownership of the IP address broadcast by the first routing daemon of the first TCP/IP stack to a second routing daemon of a second TCP/IP stack in the computer network cluster system environment after a predetermined time period for which said heartbeat signal is no longer received by said control process of the first TCP/IP stack.

* * * * *